United States Patent [19]

Guthrie

[11] Patent Number: 4,708,757
[45] Date of Patent: Nov. 24, 1987

[54] METHOD OF FORMING CORRUGATED PANEL

[76] Inventor: Walker L. Guthrie, 328 Pine Ridge Rd., Red Bank, Tenn. 37415

[21] Appl. No.: 887,448

[22] Filed: Jul. 21, 1986

[51] Int. Cl.$^4$ ............................................. B32B 31/00
[52] U.S. Cl. ...................................... 156/163; 29/446; 156/210; 156/292; 228/173.6
[58] Field of Search ............... 156/163, 160, 165, 292, 156/210; 29/455 R, 455 LM, 446; 228/173.2, 173.6, 174; 72/296, 293, 177, 176, 160, 161; 264/229

[56] References Cited

U.S. PATENT DOCUMENTS 3,479,731 11/1969 Mantel ........................... 29/455 LM Primary Examiner—Michael Ball
Attorney, Agent, or Firm—Alan Ruderman

[57] ABSTRACT

A corrugated panel in which at least the central corrugated sheet is formed from an elastically deformable material such as polyethylene synthetic plastic or spring steel is disposed and secured between a pair of cover sheets. The method of forming the panel includes stretching out a first of the cover sheets and thereafter attaching the ends of the sheet to be corrugated to the first sheet while maintaining the spacing between the remainder of the sheet. This forms a half sinusoidal shape from the sheet to be corrugated. A compressive force is thereafter applied to the sheet to be corrugated which forms it into a number of corrugations having ridges and furrows. The furrows are bonded to the base sheet and a third sheet is positioned on and bonded to the ridges of the corrugated sheet.

14 Claims, 6 Drawing Figures

METHOD OF FORMING CORRUGATED PANEL

BACKGROUND OF THE INVENTION

This invention relates to corrugated bodies and more particularly to a prestressed panel and a method of constructing such panels from sheets of flexible material.

It is known to form sheets of paper into cardboard wherein a sheet of corrugated paper is glued between a pair of paper cover sheets. The process for forming the cardboard includes wrinkling the corrugated sheet between the nip of a pair of meshing corrugation rollers which permanently wrinkles the paper sheet which is thereafter sandwiched between and glued to the other sheets of paper. It is also known to form permanently corrugated metal sheets by the rolling process for use as roof structures on certain buildings and for other purposes. When paper is corrugated, since it has substantially little yield strength with no flexibility, it is quickly deformed permanently. It thus cannot be prestressed for uses where a prestressed material may be required. Metals have a very high yield strength with little or no flexibility below its yield strength and is permanently deformed when corrugated. Thus, it too is not in a prestressed condition if used in a honey comb type structure. Synthetic plastics, such as polyethylene plastics and vinyl plastics, on the other hand are generally flexible. Unless corrugating rollers are heated so as to heat and deform the plastic sheets fed thereto, these materials revert to their original shapes or fail so that they have not been utilized as corrugated panels or the like. By forming prestressed corrugated panels from synthetic plastic materials such as polyethylene or certain metals a relatively strong structure can be constructed which can have good insulating qualities for use in buildings, especially if the voids between the corrugation ridges and furrows are filled with a material having high insulating properties such as polyurethane foam.

SUMMARY OF THE INVENTION

Consequently, it is a primary object of the present invention to provide a corrugated panel from sheets of elastically deformable material and a method for forming the panels.

It is another object of the present invention to provide synthetic plastic panels having a corrugated sheet sandwiched between a pair of substantially planar sheets, the voids between the ridges and furrows of the corrugated sheet being filled with an insulating material.

It is a further object of the present invention to provide a method of forming a prestressed corrugated panel from an elastically deformable material by forming a first sheet into a curvilinear form relative to a second sheet and thereafter applying a loading to the first sheet in a direction toward the second sheet so as to convert the curvilinear form of the first sheet into a plurality of such curvilinear forms of smaller amplitude.

Accordingly, the present invention provides a corrugated panel by a method including the steps of attaching to a first sheet of material the ends of a second sheet of elastically deformable material with the remainder of the second sheet spaced from the first sheet in curvilinear fashion and applying a compressive force to the second sheet in the direction of the first sheet until the second sheet is resiliently or elastically deformed so as to contact the first sheet at a number of locations between the ends. The force is applied in an amount and direction until the second sheet is corrugated into the desired number of curved ridges and furrows or the desired amplitude relative to the first sheet. The sheets are thereafter bonded together along the points of contact and a third sheet is disposed on the second sheet remote from the first sheet and also bonded thereto. The panels so formed may additionally be stiffened in the direction transverse to the ridges and/or the space between the first and third sheets may be filled with insulating material for various applications.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
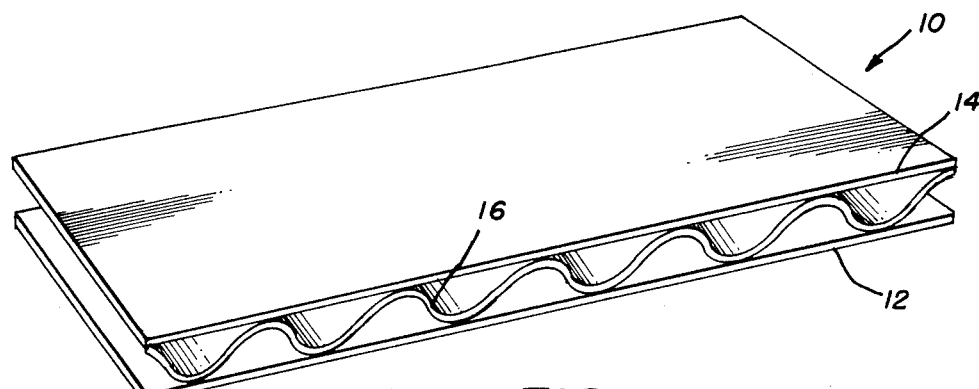
FIG. 1 is a perspective view of a panel constructed in accordance with the principles of the present invention.

Referring to the drawings, and particularly to FIG. 1, a panel 10 constructed in accordance with the principles of the present invention comprises first and second sheets 12, 14 of flexible elastically deformable material preferably a thin sheet of metal such as spring steel or a synthetic plastic such as polyethylene between which a third sheet 16 of similar material is sandwiched. The third sheet 16 is corrugated or wave shaped and is secured to the first and second sheets at respective peaks or ridges of the waves while in a prestressed state resulting from the forces applied to the third sheet when forming the corrugated configuration as hereinafter described. The manner of forming the corrugation effects a curvilinear configuration throughout the third sheet, which configuration is substantially sinusoidal.

Figure 2:
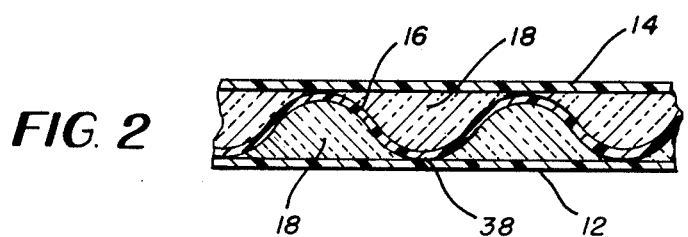
FIG. 2 is a sectional view taken through a portion of a modified panel constructed in accordance with the present invention.

The panel 10 may be utilized for various purposes such as for packaging, but since the corrugations can be of a large size, the panels have application for wall structures and partitions. Moreover, as illustrated in FIG. 2, especially where the sheets are of synthetic plastic, the voids between the waves of the third sheet and the respective first and second sheets may be filled with an insulating material such as polyurethane foam 18 and the resulting product may be used as insulating wall panels in buildings. Because of the prestressed state of the third sheet the panels have substantial strength, but if desired they may be reenforced to provide a more rigid structure by the addition of stiffeners (not illustrated) between the first and second sheets extending substantially perpendicular to the plane of the waves formed, i.e., substantially parallel to the longitudinal axis of the panel.

Figure 3:
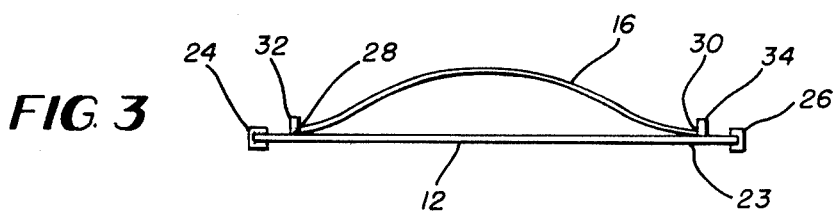
FIG. 3 is a schematic representation of a step in the process of forming a panel according to the method of the present invention.

The method of forming the panel 10 comprises securing the first sheet 12 substantially at its ends 20, 22 on a flat surface 23 or at least in a stretched disposition so that it forms a substantially planar surface. This may be accomplished by holding the ends by clamping means 24, 26. Thereafter the third sheet 16 is disposed on the first sheet and the ends thereof secured by clamping to the first sheet. The third sheet may be the same size as the first sheet in which case the third sheet is clamped to the first sheet at a disposition spaced from the ends of the first sheet or the third sheet can be longer than the first sheet and clamped at or adjacent the ends of the first sheet. In either case, the ends 28, 30 of the third sheet may be clamped by clamping means 32, 34. The length of the third sheet or the spacing of its ends 28, 30 relative to the ends of the first sheet is dependent upon the number of waves desired in the corrugation of the third sheet. This forms a curvilinear member from the third sheet in a single wave form of a substantially one-half sine wave as illustrated in FIG. 3.

Figure 4:
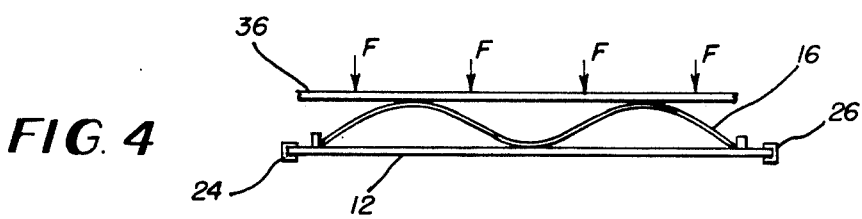
FIG. 4 is a view similar to FIG. 3 but of a subsequent step in the process.
Figure 5:
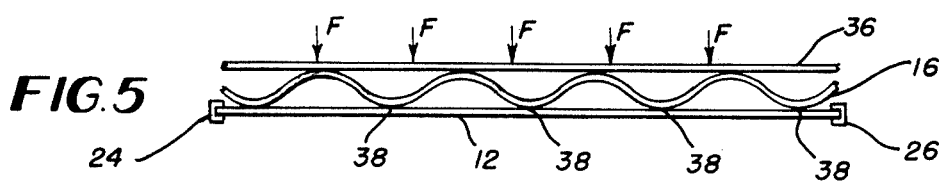
FIG. 5 is a view similar to FIG. 4 of a still subsequent step in the process.

Thereafter a gradual compressive force F is applied equally upon the third sheet at the crest thereof and directed toward the first sheet. This can be applied by a platen or other substantially flat beam 36 or the like applied to the top of the third sheet in a planar direction toward the first sheet. Due to the resiliency of the third sheet this force initially results in the third sheet being deformed to form a two wave curvilinear configuration as illustrated in FIG. 4. Continued application of the compressive force to the third sheet results in an increasing number of wave forms, each of which is substantially of a sine configuration. The number of curves appears to be exponentially related to the force applied to the third sheet.

When the desired number of curves are formed, or stated differently, when the desired amplitude of the crest of the third sheet relative to the first sheet is attained, the first and third sheets are bonded together at the contact point 38. The second sheet 14 may thereafter be disposed on the peaks of the third sheet remote from the first sheet and bonded thereto. Alternatively, the second sheet may be disposed on the third sheet prior to application of the compressive force intermediate the third sheet and the platen 36 and bonding of the third sheet to the first and second sheets may occur substantially simultaneously in the process. In either case when the platen is released the third sheet has been prestressed by an amount substantially equal to that of the compressive force and has large load bearing capacity.

Figure 6:
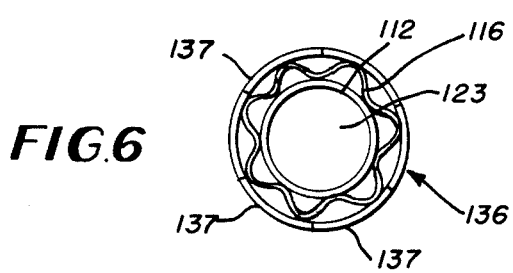
FIG. 6 is a schematic representation of the use of the process for constructing a cylindrical panel structure.

A modification of the process may be utilized to form curved bodies and cylindrical members by utilizing a complimentary shaped member against which the first sheet is disposed and a platen also of that shape can be compressed toward the first sheet. For example, as illustrated in FIG. 6, to form a cylindrical body a mandrel in the form of a central member 123 having the size and shape of the inner diameter of the cylindrical body has the first sheet 112 fastened thereto. The third sheet 116, which in this case has a greater circumferencial size than the first sheet, can be attached to the first sheet at its ends and a platen 136 in the form of a number of sectors 137 may be disposed about the third sheet and the sectors forcibly drawn radially inwardly to corrugate the third sheet. The second sheet can thereafter be attached to the third sheet to form the corrugated cylindrical body.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are included within the scope of the appended claims.

Having thus set forth the nature of the invention, what is claimed herein is:

1. The method of forming a corrugated panel having a corrugated sheet of material including alternate ridges and furrows intermediate first and second surface sheets, at least said corrugated sheet comprising an elastically deformable material, said method comprising holding said first sheet in a stretched condition, fastening to said first sheet spaced ends of the sheet to be corrugated defined as a third sheet, the remainder of said third sheet being spaced from the first sheet, applying a gradual compressive force substantially equally over said third sheet directed toward said first sheet to flex said third sheet gradually into a selective number of wave forms having alternate ridges and furrows, the furrows abutting said first sheet, securing said furrows to said first sheet, securing said second sheet to said third sheet at said ridges, and releasing the first sheet.

2. The method as recited in claim 1, wherein the compressive force is applied by a platen disposed on the third sheet.

3. The method as recited in claim 2, wherein the second sheet is fastened to the third sheet after the third sheet has been secured to the first sheet and the compressive force has been released.

4. The method as recited in claim 2, wherein the second sheet is disposed between the platen and the third sheet and the third sheet is secured to the first and second sheets prior to release of the compressive force.

5. The method as recited in claim 1, wherein the third sheet is polyethylene.

6. The method as recited in claim 1, wherein all three sheets are synthetic plastic and the steps of securing comprise bonding together the first and third sheets and the second and third sheets.

7. The method as recited in claim 6, wherein the compressive force is applied by a platen disposed on the third sheet.

8. The method as recited in claim 7, wherein the second sheet is fastened to the third sheet after the third sheet has been secured to the first sheet and the compressive force has been released.

9. The method as recited in claim 8, wherein the second sheet is disposed between the platen and the third sheet and the third sheet is secured to the first and second sheets prior to release of the compressive force.

10. The method as recited in claim 6, wherein the third sheet is polyethylene.

11. The method as recited in claim 1, wherein said panel is planar and said force is applied substantially perpendicular to the plane of said first sheet.

12. The method as recited in claim 1, including filing the voids created between the first and third sheets and the second and third sheets with an insulating material.

13. The method as recited in claim 1, wherein at least said third sheet is metal.

14. The method as recited in claim 13, wherein said metal is steel.

* * * * *